US010205850B2

(12) United States Patent
Yoshida

(10) Patent No.: US 10,205,850 B2
(45) Date of Patent: Feb. 12, 2019

(54) IMAGE PROCESSOR AND STORAGE MEDIUM STORING PROGRAM

(71) Applicant: BROTHER KOGYO KABUSHIKI KAISHA, Nagoya-shi, Aichi-ken (JP)

(72) Inventor: Yasunari Yoshida, Aichi-ken (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/706,223

(22) Filed: Sep. 15, 2017

(65) Prior Publication Data

US 2018/0084148 A1 Mar. 22, 2018

(30) Foreign Application Priority Data

Sep. 22, 2016 (JP) .................. 2016-184946

(51) Int. Cl.
*H04N 1/405* (2006.01)
*H04N 1/58* (2006.01)
*H04N 1/409* (2006.01)
*H04N 1/60* (2006.01)

(52) U.S. Cl.
CPC ......... *H04N 1/4053* (2013.01); *H04N 1/4052* (2013.01); *H04N 1/4092* (2013.01); *H04N 1/58* (2013.01); *H04N 1/6008* (2013.01); *H04N 2201/0082* (2013.01)

(58) Field of Classification Search
CPC .. H04N 1/4053; H04N 1/4052; H04N 1/4092; H04N 1/58; H04N 1/6008; H04N 2201/0082
See application file for complete search history.

(56) References Cited

U.S. PATENT DOCUMENTS

| 6,333,998 | B1 | 12/2001 | Matsumoto |
| 6,791,717 | B1 | 9/2004 | Ariga |
| 2011/0170141 | A1* | 7/2011 | Yamaguchi ............... H04N 1/52 358/3.05 |
| 2015/0256714 | A1* | 9/2015 | Yamazaki ............ H04N 1/4053 358/3.05 |

FOREIGN PATENT DOCUMENTS

| JP | 4-23566 A | 1/1992 |
| JP | 6-78140 A | 3/1994 |
| JP | 6-152947 A | 5/1994 |
| JP | 11-88682 A | 3/1999 |
| JP | 11-191845 A | 7/1999 |
| JP | 2000-138833 A | 5/2000 |
| JP | 2005-72748 A | 3/2005 |
| JP | 2014-220664 A | 11/2014 |

* cited by examiner

*Primary Examiner* — Quang N Vo
(74) *Attorney, Agent, or Firm* — Merchant & Gould P.C.

(57) ABSTRACT

An image processor sets the dot value to a value for forming a dot in a case where the dot forming condition is satisfied; sets the dot value to a value for forming no dot in a case where the dot forming condition is not satisfied and the target pixel is not the edge pixel; sets the dot value to a value for forming a dot in a case where the dot forming condition is not satisfied and a particular condition is satisfied; and sets a distribution error value to a smaller value than another error value in a case where the dot forming condition is not satisfied and the particular condition is satisfied and thereby the dot value is set to the value for forming a dot.

20 Claims, 9 Drawing Sheets

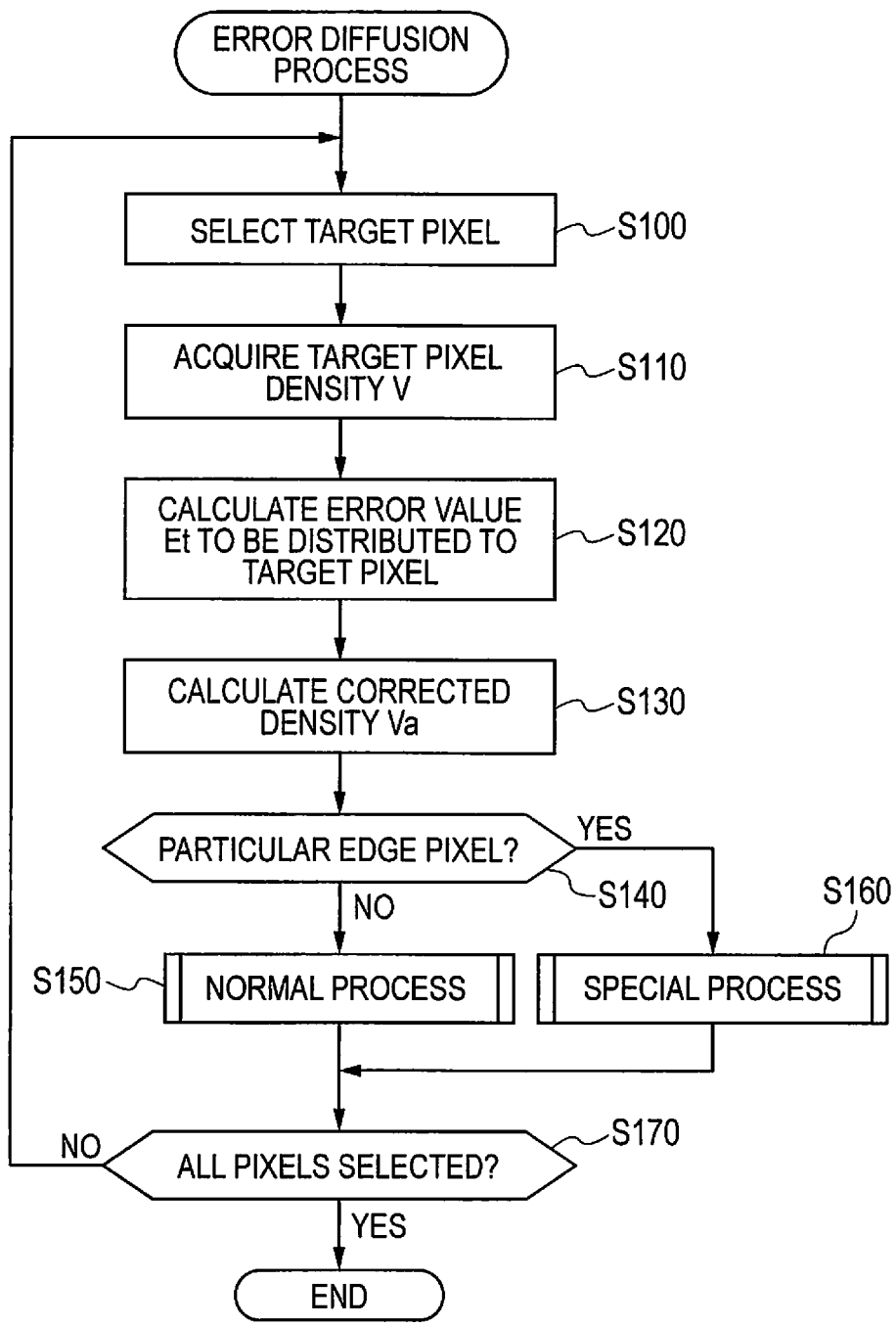

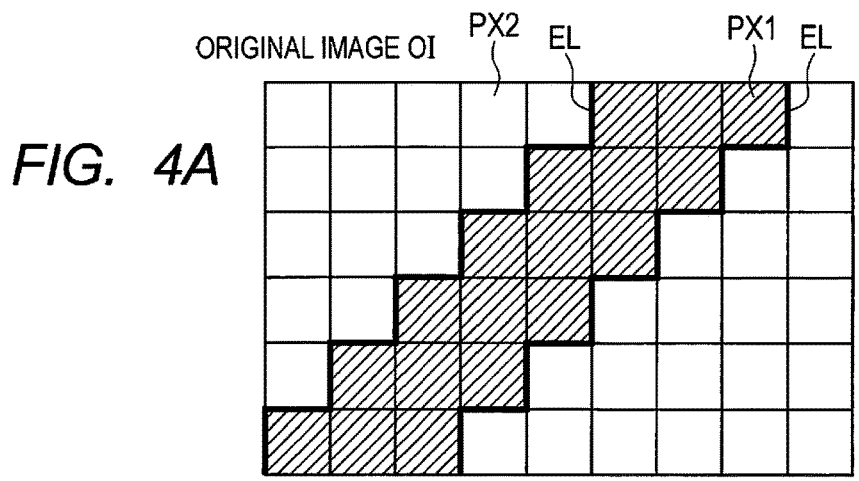
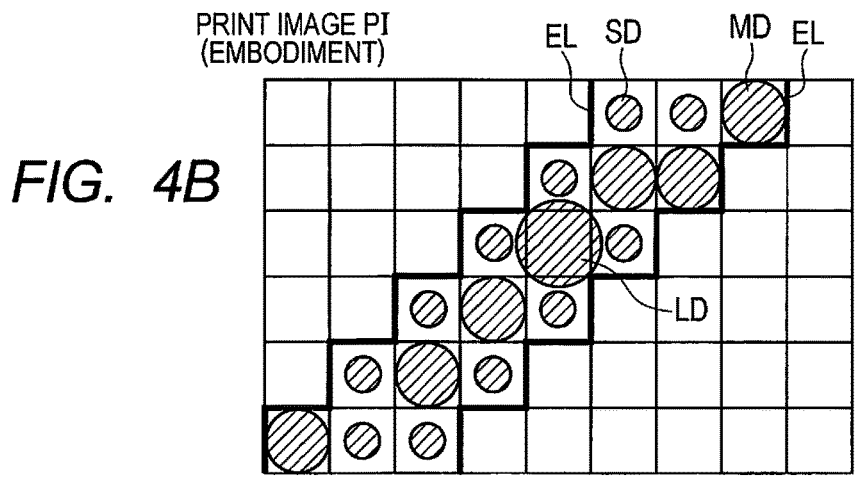
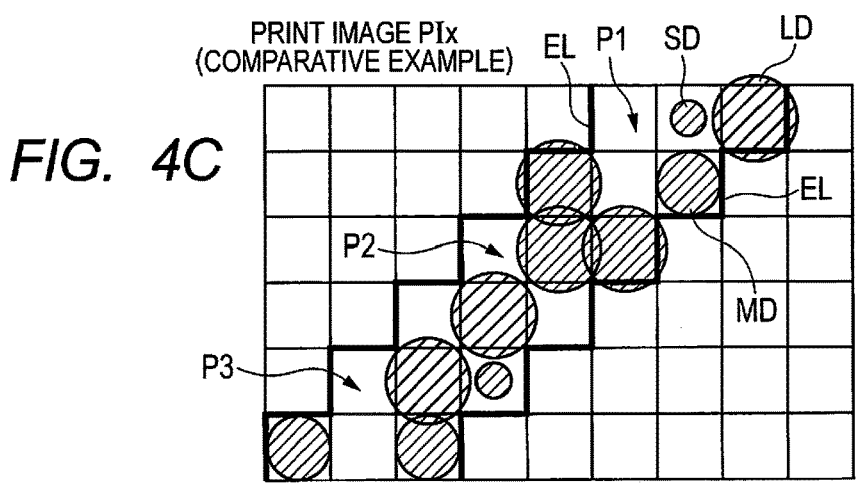

ERROR MATRIX MT

FILTER FL

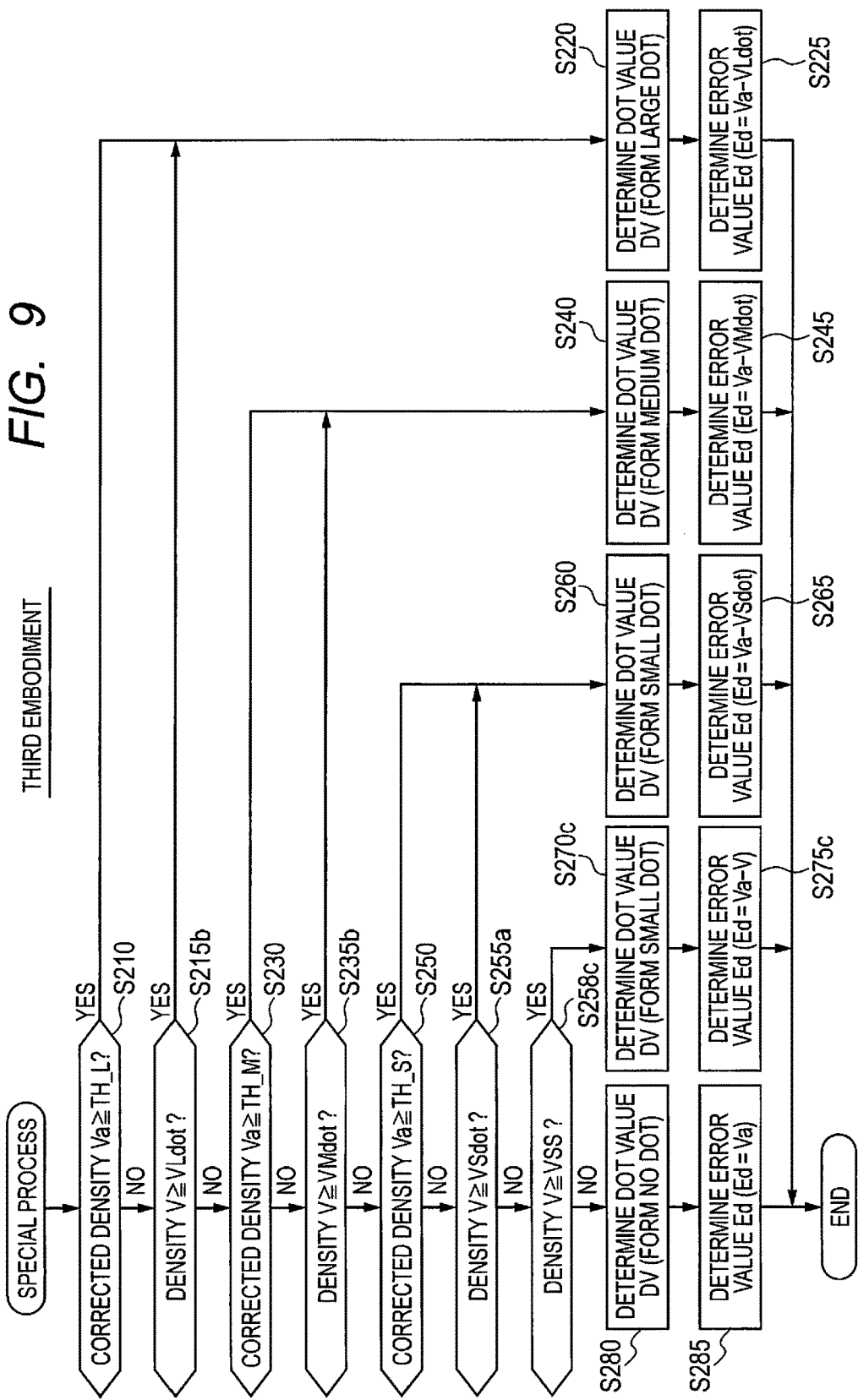

IMAGE PROCESSOR AND STORAGE MEDIUM STORING PROGRAM

CROSS REFERENCE TO RELATED APPLICATIONS

This application claims priority from Japanese Patent Application No. 2016-184946 filed Sep. 22, 2016. The entire content of the priority application is incorporated herein by reference.

TECHNICAL FIELD

This specification relates to image processing for printing, and particularly relates to processing for determining a dot value indicative of a dot formation state for each pixel.

BACKGROUND

Known image processing includes a binarization process from a multivalued image including pixels having density of intermediate tones into an image having black pixels and white pixels. This process determines whether a target pixel is an edge pixel, then it is determined based on the determination result whether the target pixel is a part of a line segment. When the target pixel is not a part of a line segment, the target pixel is determined to be either a black pixel or a white pixel based on an error diffusion method. When the target pixel is a part of a line segment, regardless of a result based on the error diffusion method, the target pixel is determined to be either a black pixel or a white pixel depending on the adjacent pattern. Accordingly, it is described that this process enables to prevent a part of a thin line from being broken. In addition, regardless of whether the target pixel is determined to be either a black pixel or a white pixel, the error based on the result of the error diffusion method is distributed to the adjacent pixels.

SUMMARY

According to one aspect, this specification discloses an image processor for a printer. The image processor for a printer includes a processor and a memory storing instructions. When executed by the processor, the instructions cause the processor to perform: acquiring original image data representing an original image including a plurality of pixels, the original image data being indicative of a density of each of the plurality of pixels; determining whether a dot forming condition of an error diffusion method is satisfied by using a density of a target pixel in the plurality of pixels and an error value distributed to the target pixel; determining whether the target pixel is an edge pixel constituting an edge together with a surrounding pixel, the edge pixel having a higher density than a density of the surrounding pixel; determining a dot value indicative of a dot formation state of the target pixel, the determining the dot value including: setting the dot value to a value indicative of forming a dot in a case where the dot forming condition is satisfied; setting the dot value to a value indicative of forming no dot in a case where the dot forming condition is not satisfied and the target pixel is not the edge pixel; and setting the dot value to a value indicative of forming a dot in a case where the dot forming condition is not satisfied and a particular condition is satisfied, the particular condition including that the target pixel is the edge pixel; setting a distribution error value to a smaller value than another error value in a case where the dot forming condition is not satisfied and the particular condition is satisfied and thereby the dot value of the target pixel is set to the value indicative of forming a dot, the distribution error value being an error value to be distributed from the target pixel to an unprocessed pixel, and the another error value being an error value to be distributed from the target pixel to the unprocessed pixel in a case where the dot value of the target pixel is set to the value indicative of forming no dot; and generating print data including the dot value of each of the plurality of pixels determined by processing each of the plurality of pixels as the target pixel.

According to another aspect, this specification also discloses a non-transitory computer-readable storage medium storing a set of program instructions executable on an image processor for a printer. The set of program instructions includes: acquiring original image data representing an original image including a plurality of pixels, the original image data being indicative of a density of each of the plurality of pixels; determining whether a dot forming condition of an error diffusion method is satisfied by using a density of a target pixel in the plurality of pixels and an error value distributed to the target pixel; determining whether the target pixel is an edge pixel constituting an edge together with a surrounding pixel, the edge pixel having a higher density than a density of the surrounding pixel; determining a dot value indicative of a dot formation state of the target pixel, the determining the dot value including: setting the dot value to a value indicative of forming a dot in a case where the dot forming condition is satisfied; setting the dot value to a value indicative of forming no dot in a case where the dot forming condition is not satisfied and the target pixel is not the edge pixel; and setting the dot value to a value indicative of forming a dot in a case where the dot forming condition is not satisfied and a particular condition is satisfied, the particular condition including that the target pixel is the edge pixel; setting a distribution error value to a smaller value than another error value in a case where the dot forming condition is not satisfied and the particular condition is satisfied and thereby the dot value of the target pixel is set to the value indicative of forming a dot, the distribution error value being an error value to be distributed from the target pixel to an unprocessed pixel, and the another error value being an error value to be distributed from the target pixel to the unprocessed pixel in a case where the dot value of the target pixel is set to the value indicative of forming no dot; and generating print data including the dot value of each of the plurality of pixels determined by processing each of the plurality of pixels as the target pixel.

BRIEF DESCRIPTION OF THE DRAWINGS

Embodiments in accordance with this disclosure will be described in detail with reference to the following figures wherein:

FIG. 3 is a flowchart of an error diffusion process;

FIGS. 4A, 4B, and 4C are explanatory diagrams of the error diffusion process;

FIG. 9 is a flowchart of a special process of a third embodiment.

DETAILED DESCRIPTION

However, since the above technique distributes errors regardless of the final result of binarization, density difference between the original multivalued image and the binarized image tends to become larger. Hence, there is a possibility that the quality of the outputted image may be deteriorated.

In view of the foregoing, an example of an object of this disclosure is to provide a technique for preventing thin lines in a printed image from being broken and for suppressing an increase of a density difference between the original image and the binarized image.

A. First Embodiment

A-1. Configuration of Printing System 1000

Figure 1:
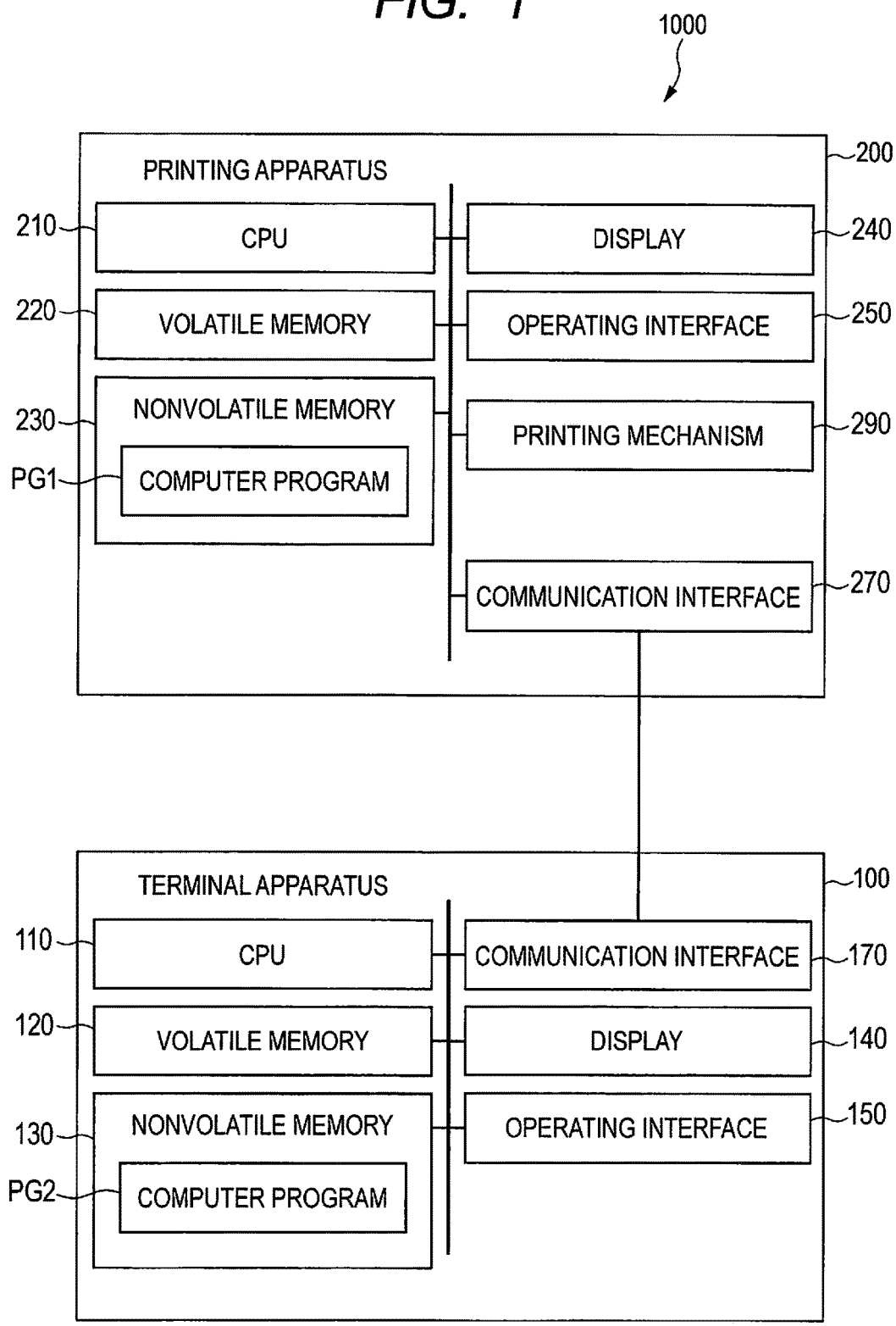
FIG. 1 is a block diagram illustrating a configuration of a printing system.

As shown in FIG. 1, the printing system 1000 is provided with a terminal apparatus 100 as an image processor for a printing apparatus and a printer 200 as the printing apparatus. The terminal apparatus 100 and the printer 200 are communicably connected to each other through a LAN (Local Area Network), a USB cable, or the like.

The printer 200 is provided with: a CPU 210 as a controller of the printer 200; a volatile memory 220 such as a DRAM; a nonvolatile memory 230 such as a flash memory and a hard disk drive; a display 240, such as a liquid crystal display, for showing user interface screens (hereinafter, also refer to as "UI screen"); an operating interface 250 configured to acquire users operation, such as a touch panel and buttons; a communication interface 270 configured to communicate with external devices; and a printing mechanism 290. For example, the communication interface 270 includes an interface for connection to a network, such as a LAN, and a USB interface for connecting with external devices.

The printing mechanism 290 is an inkjet-type printing mechanism which prints images using a plurality of kinds of ink as the colorant. The printing mechanism 290 creates an image on paper by forming dots of ink injected from nozzles of a printing head. The printing mechanism 290 is configured to form a plurality of sizes of dots for each ink: for example, a small dot, a medium dot larger than the small dot, and a large dot larger than the medium dot. The plurality of types of ink in this embodiment includes four kinds of ink of cyan (C), magenta (M), yellow (Y), and black (B).

The volatile memory 220 provides a buffer region for temporarily storing various data produced by processing of the CPU 210. The nonvolatile memory 230 stores a computer program PG1 therein. The computer program PG1 is stored in the nonvolatile memory 230 in advance at a time of production of the printer 200. Alternatively, the computer program PG1 may be provided by downloading from a server connected through the Internet or provided by being recorded in a storage medium such as a DVD-ROM.

The CPU 210 controls the printer 200 by executing the computer program PG1. For instance, the CPU 210 executes printing by controlling the printing mechanism 290 in accordance with an instruction from the terminal apparatus 100.

The terminal apparatus 100 is a known computer used by the user of the printer 200, and is a personal computer or a smart phone, for example. The terminal apparatus 100 is provided with: a CPU 110 as a controller of the terminal apparatus 100; a volatile memory 120 such as a DRAM; a nonvolatile memory 130 such as a flash memory and a hard disk drive; a display 140 for displaying screens including a UI screen, such as a liquid crystal display; an operating interface 150 configured to acquire users' operation input, such as a keyboard and a mouse; and a communication interface 170 configured to communicate with external devices such as the printer 200. For example, the communication interface 170 includes an interface for connection to a network such as LAN and a USB interface for connection to external devices.

The volatile memory 120 provides a buffer region for temporarily storing various data produced by processing of the CPU 110. The nonvolatile memory 130 stores a computer program PG2. The computer program PG2 may be, for example, a printer diver program provided by a manufacturer of the printer 200. The computer program PG2, for example, is provided by downloading from a server connected through an internet. Alternatively, the computer program PG2 may also be provided by being recorded in a storage medium such as a DVD-ROM.

By executing the computer program PG2, the CPU 110 executes a process as a printer driver for the printer 200 such as a printing process described below.

A-2. Printing Process

Figure 2:
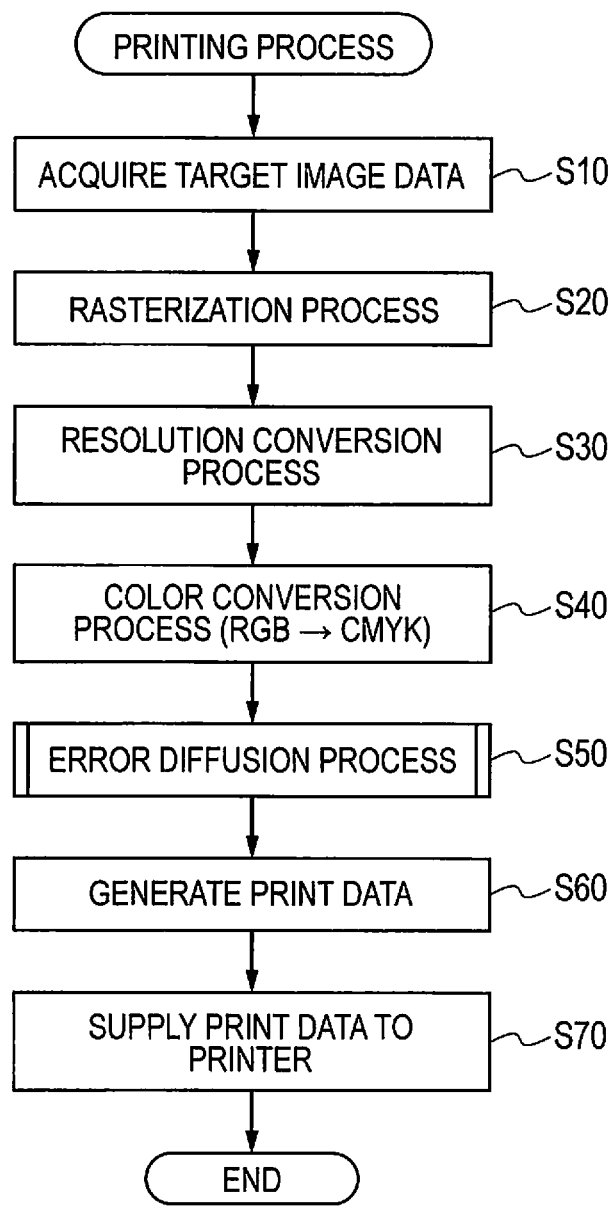
FIG. 2 is a flowchart of a printing process of a first embodiment.

As shown in FIG. 2, the printing process starts in the terminal apparatus 100, for example, when the printer driver (the computer program PG2) is started through an application program such as word processing software and drawing software and then a print instruction is inputted to the printer driver. In this embodiment, the print instruction includes at least an instruction for specifying a target image data to be used for printing.

In S10, the CPU 110 acquires the target image data specified by the print instruction. The target image data may be, for example, an image data (vector data) produced by the application program.

In S20, the CPU 110 executes a rasterization process on the acquired target image data. The rasterization process is a process to convert the target image data into bit map data. The bit map data is, for example, RGB image data which expresses color of each pixel with RGB values. The RGB values of one pixel include tone values of three color components: i.e. red (R), green (G), and blue (B) (e.g., tone value of 256 tones from 0 to 255). In S30, the CPU 110 executes a resolution conversion process on the RGB image data to convert the RGB image data into image data having the number of pixels corresponding to the print resolution.

In S40, the CPU 110 executes a color conversion process on the RGB image data to generate CMYK image data which expresses color of each pixel by CMYK values. The CMYK values include a plurality of kinds of color values (i.e. C value, M value, Y value, and K value) corresponding to a plurality of kinds of ink (i.e. C, M, Y, K) used in the printing mechanism 290. Each component value of the CMYK value in this embodiment is a value of 256 tones from 0 to 255. The color conversion process is performed by using a lookup table (not shown) which specifies the correspondence relation between the RGB tone values and the CMYK tone values.

In S50, the CPU 110 executes an error diffusion process on the CMYK image data to generate dot data indicative of a dot formation state for each pixel and for each kind of ink. The dot formation state in this embodiment is any one of no dot, small dot, medium dot, and large dot. In other words, the value of plurality of pixels (also referred to as "dot value") included in the dot data is any one of a value indicative of forming no dot, a value indicative of forming a small dot, a value indicative of forming a medium dot, and a value indicative of forming a large dot.

In S60, the CPU 110 rearranges the dot data in a printing order and adds control data such as printing command to generate print data. In S70, the CPU 110 provides the generated print data to the printer 200 and then ends the printing process. In accordance with the print data provided from the terminal apparatus 100, the CPU 210 of the printer 200 controls the printing mechanism 290 to print the image on paper.

A-3. Error Diffusion Process

Hereinafter, the error diffusion process (S50) shown in FIG. 2 will be described. As shown in FIG. 3, CMYK image data includes four component image data corresponding to ink of C, M, Y, and K, respectively. The value of a plurality of pixels included in each component image data indicates density of corresponding ink for each pixel. The process of FIG. 3 is for one component image data corresponding to one kind of ink. The process of FIG. 3 is performed for each of the four component image data. FIG. 4A shows an image expressed by one component image data (also referred to as "original image OI").

In S100, the CPU 110 selects one target pixel, which is to be a target of the following process from S110 to S160, among a plurality of pixels contained in the original image OI. For example, in the original image OI of FIG. 4A, a plurality of pixels are arranged in a matrix shape in X and Y directions. The CPU 110 executes processing one pixel after another as the target pixel in the +X direction, thereby executing processing of one pixel line extending in the X direction. When processing of one image pixel line is completed, the CPU 110 executes processing one pixel after another as the target pixel for another image line adjacent to the processed line in the +Y direction.

Figure 5A:
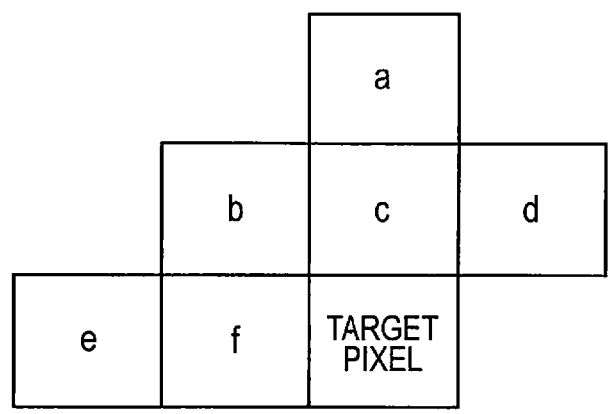
FIG. 5A is a chart showing an example of an error matrix MT.

In S110, the CPU 10 acquires a target pixel density V (the density V of the target pixel). In S120, the CPU 110 acquires an error value Et distributed to the target pixel from the adjacent already-processed pixels by using an error matrix MT. As shown in FIG. 5A, the error matrix MT assigns a weight larger than zero to pixels arranged at certain relative positions close to the target pixel. An example shown in FIG. 5A illustrates that weight from a to f are assigned to each of six pixels close to the target pixel. The total of the weights from a to f is one. The six pixels close to the target pixel shown in the error matrix MT have already been processed as a target pixel prior to the current target pixel, respectively, and the error values corresponding to these pixels have been calculated in such process. By using the weights specified by the error matrix MT, the CPU 110 calculates the weighted sum of the error values corresponding to these six pixels close to the target pixel as the error value Et.

In S130, the CPU 110 adds the error value Et to the target pixel density V to obtain corrected density Va.

Figure 5B:
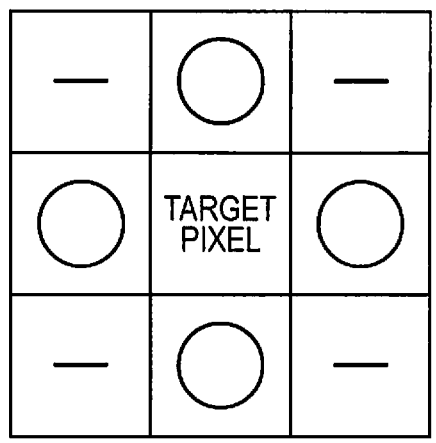
FIG. 5B is a chart showing an example of a filter FL.

In S140, the CPU 110 determines whether the target pixel is a particular edge pixel. This determination is carried out by using the filter FL shown in FIG. 5B. The filter FL shows whether each of the eight peripheral pixels surrounding the target pixel is a pixel to be checked. In FIG. 5B, pixels with a circle mark (○) are pixels to be checked, while pixels with a hyphen (-) are pixels not to be checked. In other words, in this embodiment, the pixels to be checked are four pixels adjacent to the target pixel in the +Y direction, the −Y direction, the +X direction, and the −X direction. When the density of the target pixel is higher than or equal to a reference density Th1 and the density of at least one pixel out of four pixels to be checked is lower than or equal to a reference density Th2, the target pixel is determined as the particular edge pixel. The value of the reference density Th1 in this embodiment may be a small dot density VSdot, or may be a value smaller than the small dot density VSdot. In this embodiment, the value of the reference density Th2 is the lowest density. If the density is expressed by 256 tones from zero to 255, the reference density Th2 is zero, for example.

In this embodiment, the particular edge pixel is a pixel to form an edge with peripheral pixels (for example, pixels adjacent to the target pixel in the vertical and horizontal directions), and is a pixel of which density is higher than the density of the peripheral pixels. In this embodiment, pixels which form an edge of a letter having higher density than the density of the background are assumed to be the particular edge pixels.

If the target pixel is not the particular edge pixel (S140: No), the CPU 110 executes a normal process in S150. If the target pixel is the particular edge pixel (S140: Yes), the CPU 110 executes a special process in S160. By executing either the normal process or the special process, a dot value DV of the target pixel is determined, and a distributed error value Ed corresponding to the target pixel is determined. The distributed error value Ed corresponding to the target pixel means an error value to be distributed from the target pixel to unprocessed pixels. The normal process and the special process will be described later.

In S170, the CPU 110 determines whether all of the pixels in the original image OI have been selected as the target pixel. If an unprocessed pixel exists (S170: No), the CPU 110 returns to S100 so as to select the unprocessed pixel. If all of the pixels has been selected as the target pixel (S170: Yes), the CPU 110 ends the error diffusion process.

A-4. Normal Process

Figure 6:
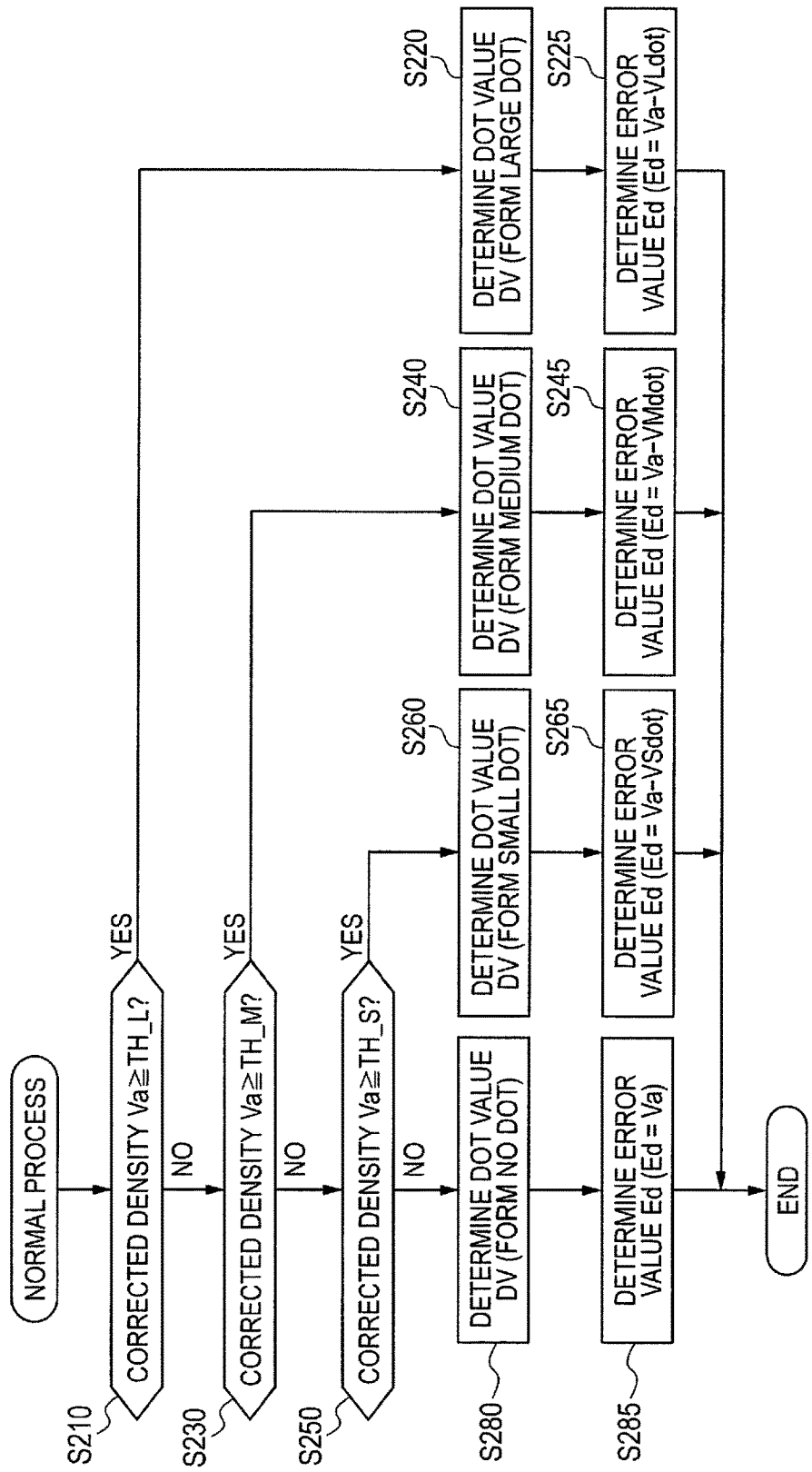
FIG. 6 is a flowchart of a normal process.

As shown in FIG. 6, in S210, the CPU 110 determines whether the corrected density Va is higher than or equal to a determination threshold for large dot TH_L. When the corrected density Va is higher than or equal to the determination threshold for large dot TH_L (S210: Yes), the CPU 110 sets the dot value DV to a value indicative of formation of a large dot in S220. In S225, the CPU 110 sets the distributed error value Ed to a value that is calculated by subtracting a value of the large dot density VLdot from the corrected density Va. The distributed error value Ed=(Va−VLdot) in this case is an error value to be distributed from the target pixel when a large dot is formed in the target pixel of the print image (also referred to as an error value corresponding to the large dot density). The large dot density VLdot in this embodiment is the maximum density. For example, the large dot density VLdot is 255 when the density is represented by the value of 256 tones from 0 to 255. The determination threshold for large dot TH_L is a smaller value than the large dot density VLdot. For example, the determination threshold for large dot TH_L is 128 when the density is represented by the value of 256 tones from 0 to 255.

In a case where the corrected density Va is lower than the determination threshold for large dot TH_L (S210: No), in S230, the CPU 110 determines whether the corrected density Va is higher than or equal to a determination threshold for medium dot TH_M. When the corrected density Va is higher than or equal to the determination threshold for medium dot TH_M (S230: Yes), in S240, the CPU 110 sets the dot value DV to a value indicative of forming a medium dot. In S245, the CPU 110 sets the distributed error value Ed to a value that is calculated by subtracting a value of the medium dot density VMdot from the corrected density Va. The distributed error value Ed=(Va−VMdot) in this case is an error value to be distributed from the target pixel when forming a medium dot in the target pixel of the print image (also referred to as an error value corresponding to the medium dot density). The medium dot density VMdot is, for example, 128 when the density is represented by the value of 256 tones from 0 to 255. The determination threshold for medium dot TH_M is a smaller value than the medium dot density VMdot. For example, the determination threshold for medium dot TH_M is 64 when the density is represented by the value of 256 tones from 0 to 255.

In a case where the corrected density Va is lower than the determination threshold for medium dot TH_M (S230: No), in S250, the CPU 110 determines whether the corrected density Va is higher than or equal to a determination threshold for small dot TH_S. In a case where the corrected density Va is higher than or equal to the determination threshold for small dot TH_S (S250: Yes), in S260, the CPU 110 sets the dot value DV to a value indicative of forming a small dot. In S265, the CPU 110 sets the distributed error value Ed to a value that is calculated by subtracting a value of the small dot density VSdot from the corrected density Va. The distributed error value Ed=(Va−VSdot) in this case is an error value to be distributed from the target pixel when a small dot is formed in the target pixel of the print image (also referred to as an error value corresponding to the small dot density.). The small dot density VSdot is, for example, 64 when the density is represented by the value of 256 tones from 0 to 255. The determination threshold for small dot TH_S is a smaller value than the small dot density VSdot. For example, the determination threshold for small dot TH_S is one (1) when the density is represented by the value of 256 tones from 0 to 255.

In a case where the corrected density Va is lower than the determination threshold for small dot TH_S (S250: No), in S280, the CPU 110 sets the dot value DV to a value indicative of forming no dot. In S285, the CPU 110 sets the distributed error value Ed to the corrected density Va.

Once the dot value DV of the target pixel and the distributed error value Ed have been determined, the normal process ends.

The dot forming condition in the normal process is a dot forming condition of a common error diffusion method, it is described as follows with reference to the above-described flow chart of the normal process. A large dot forming condition is that the corrected density Va is higher than or equal to the determination threshold for large dot TH_L (Va≥TH_L). A medium dot forming condition is that the corrected density Va is lower than the determination threshold for large dot TH_L and is higher than or equal to the determination threshold for medium dot TH_M (TH_M≤Va<TH_L). A small dot forming condition is that the corrected density Va is lower than the determination threshold for medium dot TH_M and is higher than or equal to the determination threshold for small dot TH_S (TH_S≤Va<TH_M). Hereinafter, when simply referring to "dot forming condition", it means the above-described dot forming condition for the error diffusion method.

A-5. Special Process

Figure 7:
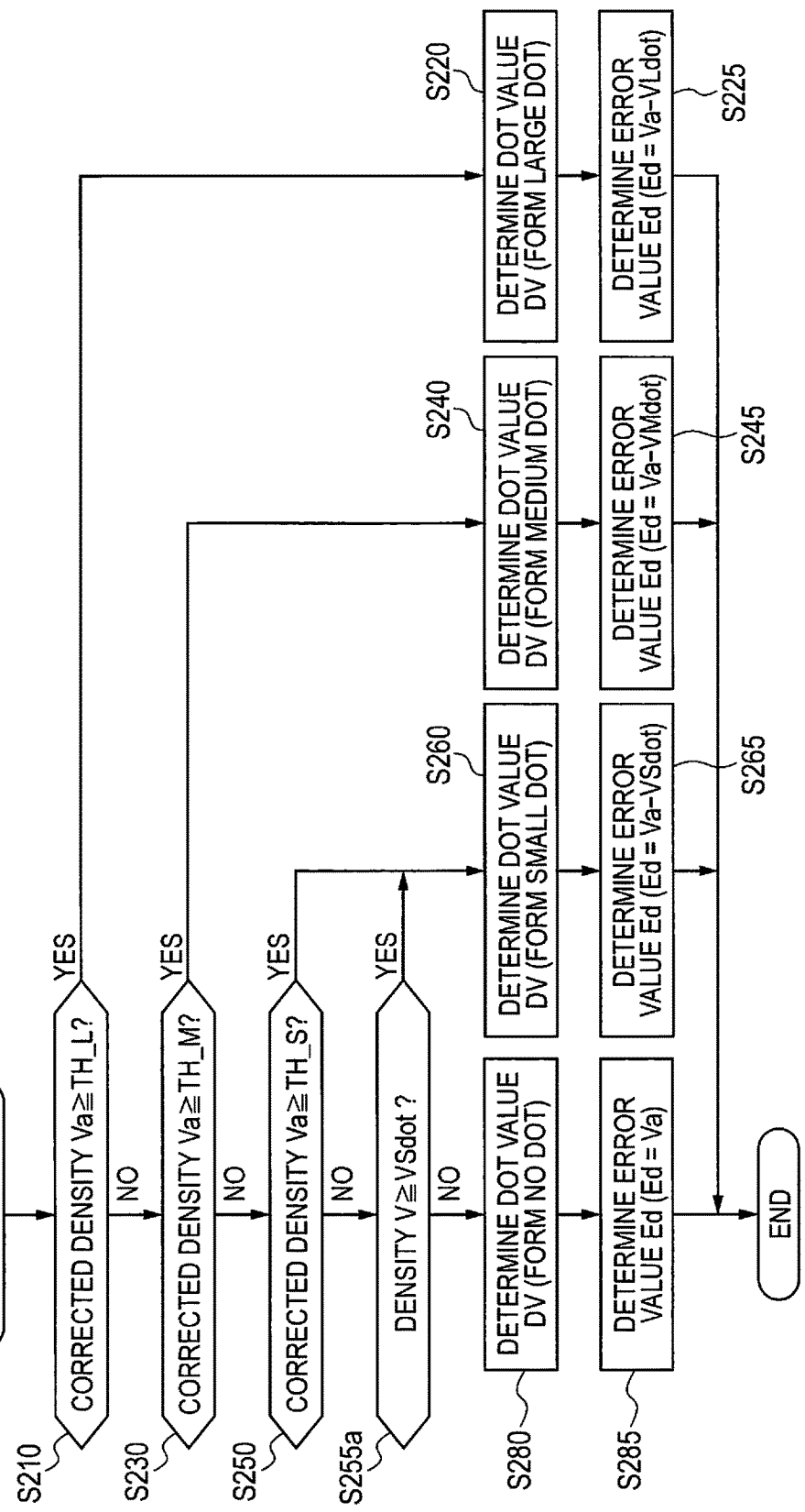
FIG. 7 is a flowchart of a special process of the first embodiment.

The difference of the special process of FIG. 7 from the normal process of FIG. 6 is that, in S250, a step S255a is added which is performed in a case where the corrected density Va is lower than the determination threshold for small dot TH_S (S250: No).

In S255a, the CPU 110 determines whether the target pixel density V is higher than or equal to the small dot density VSdot. When the target pixel density V is higher than or equal to the small dot density VSdot (S255a: Yes), in S260, the CPU 110 sets the dot value DV to a value indicative of forming a small dot. In S265, the CPU 110 sets the distributed error value Ed to a value that is calculated by subtracting the small dot density VSdot from the corrected density Va.

In a case where the target pixel density V is lower than the small dot density VSdot (S255a: No), in S280, the CPU 110 sets the dot value DV to a value indicative of forming no dot. In S285, the CPU 110 sets the distributed error value Ed to the corrected density Va.

The other steps of the special process of FIG. 7 are the same as those of the normal process of FIG. 6. In FIG. 7, the same steps as those of FIG. 6 are indicated by the same reference numerals as those of FIG. 6.

In the above-described first embodiment, the CPU 110 determines whether the target pixel satisfies the dot forming condition of the error diffusion method (S210, S230, and S250 of FIGS. 6, 7). The CPU 110 also determines whether the target pixel is a particular edge pixel (S140 of FIG. 3). In a case where the dot forming condition is satisfied (S210, S230, and S250 of FIGS. 6, 7), the CPU 110 sets the dot value DV to a value indicative of forming a dot (S220, S240, and S260 of FIGS. 6, 7). In a case where the dot forming condition is not satisfied (No in all of S210, S230, and S250 of FIG. 6) and where the target pixel is not the particular edge pixel neither (S140: No of FIG. 3), the CPU 110 sets the dot value DV to a value indicative of forming no dot (S280 of FIG. 6). In a case where the dot forming condition is not satisfied (No in all of S210, S230, and S250 of FIG. 7) and a particular condition including the target pixel being the particular edge pixels is satisfied (S140: Yes of FIG. 3 and S255a: Yes of FIG. 7), the CPU 110 sets the dot value DV to a value indicative of forming a small dot (S260 of FIG. 7). As a result, according to the first embodiment, even when the dot forming condition of the error diffusion method is not satisfied, if the particular condition including the target pixel being the particular edge pixels is satisfied, the dot value DV of the target pixel is set to a value indicative of forming a small dot. This suppresses occurrence of defects that thin lines which form letters or the like narrow excessively and that thin lines are broken (hereinafter, also referred to as "break or discontinuity of thin line").

For example, in the original image OI shown in FIG. 4A, a plurality of hatched pixels PX1 has a density higher than or equal to the reference density Th1 (e.g., pixel having density of 150) and form a thin line. A plurality of unhatched pixels PX2 has a density lower than or equal to the reference density Th2 (e.g., pixels having density of zero). This thin line is, for example, a part of a small letter having a height of four points (about 1.4 mm).

FIG. 4B shows a print image PI expressed by dot data generated by the error diffusion process of the first embodiment (FIG. 3). FIG. 4C shows a print image PIx expressed by dot data generated by the error diffusion process of a comparative example. The error diffusion process of the comparative example is a process where S140 and S160 are omitted from the flowchart of FIG. 3. In other words, the error diffusion process of the comparative example is a common error diffusion process in which the normal process S150 of FIG. 3 is performed for all the target pixels. The bold lines EL of the print images PI and PIx show, in the original image OI, an edge between the plurality of pixels PX1 forming a thin line and the plurality of pixels PX2 surrounding the pixels PX1. Hatched circles LD, MD, and SD in the print image PI and PIx show a large dot, a medium dot, and a small dot, respectively.

In the print image PIx of the comparative example in FIG. 4C, there is a possibility that a dot is not formed at a position corresponding to the plurality of pixels PX1 along the edge EL of the original image OI. For example, there is a case where objects or the like around a thin line of the original image OI causes the error value Et distributed to pixels PX1 which are arranged along the edge EL to be excessively small (for example, negative value) in the error diffusion process. In this case, the dot value of the pixels PX1 may be set to a value indicative of forming no dot. As a result, in the print image PIx of FIG. 4C, break of a thin line occurs at the parts P1 to P3 indicated by the arrows. In addition, in the print image PIx, dots may or may not be formed at a position corresponding to the plurality of pixels PX1 along the edge EL of the original image OI. Hence, in the print image PIx, jaggies on the edges of the image of the thin line tend to become larger.

On the other hand, in the print image PI of the first embodiment in FIG. 4B, in a case where the density of the pixel PX1 is higher than or equal to the small dot density VSdot (S255a: Yes of FIG. 7), dots are always formed at a position corresponding to the plurality of pixels PX1 along the edge EL of the original image OI. Hence, in the print image PI of FIG. 4B, break of a thin line can be suppressed. Excessive enlargement of jaggies on a thin line edge may also be suppressed.

Moreover, in the first embodiment, in a case where the dot forming condition is not satisfied (No in all of S210, S230, and S250 of FIG. 7) and a particular condition including that the target pixel is the particular edge pixel is satisfied (S140: Yes of FIG. 3, S255a: Yes of FIG. 7), the CPU 110 sets the distributed error value Ed to be distributed from the target pixel to unprocessed pixels to a value (Va−VSdot) (S265 of FIG. 7). The distributed error value Ed is Va in a case where the dot value DV of the target pixel is set to a value indicative of forming no dot. Therefore, the distributed error value Ed=(Va−VSdot) in this case is an error value to be distributed from the target pixel when a small dot is formed in the target pixel (also referred to as an error value corresponding to the density of a small dot). The distributed error value Ed is a value smaller than the value that is set when the dot value DV of the target pixel is set to a value indicative of forming no dot. As a result, enlargement of the density difference between the print image PI and the original image OI can be suppressed. For example, it is assumed that, when the dot value DV of the target pixel along the edge EL is set to a value indicative of forming a small dot even though the dot forming condition of the error diffusion method is not satisfied, the distribution error value Ed of the target pixel is set to the same value as the case where the dot value DV of the target pixel is set to a value indicative of forming no dot. In this case, even though a dot is formed in the target pixel in the print image, an excessively large error value is distributed to unprocessed pixels. Thus, there is a possibility that the density of the print image (for example, the density of a letter formed by thin lines) becomes excessively higher than the density of the original image OI. Since the first embodiment suppresses distribution of excessively large error values to the unprocessed pixels, widening of the density difference between the print image PI and the original image OI can be suppressed.

As understood from the above description, according to the first embodiment, the density difference between the print image PI and the original image OI can be suppressed while suppressing break of a thin line.

In addition, in the first embodiment, the above-described particular condition is that the target pixel is the particular edge pixel and the target pixel density V is higher than or equal to the small dot density VSdot. In other words, in a case where the target pixel does not satisfy the dot forming condition (No in all of S210, S230, and S250 of FIG. 7), where the target pixel is the particular edge pixel (S140: Yes of FIG. 3), and where the target pixel density is higher than or equal to the small dot density VSdot (S255a: Yes of FIG. 7), the dot value DV is set to a value indicative of forming a dot (S260 of FIG. 7). On the other hand, in a case where the dot forming condition is not satisfied (No in all of S210, S230, and S250 of FIG. 7), where the target pixel is the particular edge pixel (S140: Yes of FIG. 3), and where the target pixel density is lower than the small dot density VSdot (S255a: No of FIG. 7), the dot value DV is set to a value indicative of forming no dot (S280 of FIG. 7). Accordingly, when the dot forming condition is not satisfied and the target pixel is the particular edge pixel, whether to form a dot or form no dot can be properly determined depending on the target pixel density V. Hence, break of a thin line can be suppressed properly.

Moreover, according to the first embodiment, in a case where the corrected density Va is higher than or equal to the determination threshold for small dot TH_S, the dot forming condition of the error diffusion method is determined to be satisfied (S250 of FIGS. 6 and 7). The density used for determining the above particular condition (the small dot density VSdot) is higher than or equal to the determination threshold for small dot TH_S (that is, VSdot TH_S). As a result, it is possible to suppress forming a dot at a position corresponding to a pixel having excessively low density in the original image OI irrespective of the dot forming condition of the error diffusion method. Accordingly, widening of the density difference between the print image PI and the original image OI can be suppressed. Forming the print image PI far different from the original image OI can also be suppressed.

Further, according to the first embodiment, there are two cases of: a first case that the dot value DV of the target pixel is set to a value indicative of forming a small dot (S260 of FIGS. 6 and 7) by satisfying the small dot forming condition (S250: Yes in FIGS. 6 and 7); and a second case that the dot value DV of the target pixel is set to a value indicative of forming a small dot (S260 of FIG. 7) by not satisfying the small dot forming condition and satisfying the particular condition (S255a: Yes of FIG. 7). In a case where the dot value of the target pixel is set to a value indicative of forming a small dot, whichever the above case is, in other words, irrespective of whether the small dot forming condition is satisfied, the distributed error value Ed is determined to be an error value corresponding to the density of a small dot (S265 of FIGS. 6 and 7). As a result, the error value is properly determined depending on the dot that is actually formed, thereby further suppressing the density difference between the print image PI and the original image OI.

Moreover, according to the first embodiment, the printer 200 is configured to form a medium dot and a small dot which is smaller than the medium dot. In the error diffusion process, in a case where the medium dot forming condition is satisfied (S230: Yes of FIGS. 6 and 7), the CPU 110 sets the dot value DV to a value indicative of forming a medium dot (S240 of FIGS. 6 and 7). In a case where the small dot forming condition is satisfied (S250 of FIGS. 6 and 7: Yes), the CPU 110 sets the dot value DV to a value indicative of forming a small dot (S260 of FIGS. 6 and 7). In the case where both the medium dot forming condition and the small dot forming condition are not satisfied (No in S230 and S250 of FIGS. 6 and 7) and where the target pixel is not the particular edge pixel (S140: No of FIG. 3), the CPU 110 sets the dot value DV to a value indicative of forming no dot (S280 of FIG. 6). In a case where the particular condition is satisfied (S140: Yes of FIG. 3, S255a: Yes of FIG. 7) and the small dot forming condition is not satisfied (S230: No of FIG. 7), the CPU 110 sets the dot value DV to a value indicative of forming a small dot. As a result, dots are surely formed along the edge of a thin line in the print image PI printed by the printer 200 which is configured to form a plurality of kinds of dots, thereby suppressing break of thin lines.

Further, according to the first embodiment, in a case where the dot forming conditions of large dot and medium dot are not satisfied, regardless of whether the particular condition is satisfied, the dot value DV is not set to a value indicative of forming a large dot or a medium dot. In other words, when the target pixel does not satisfy the dot forming condition, only a small dot is formed in the target pixel of the print image PI, but no large dot nor medium dot is formed. Assume that, if the target pixel does not satisfy the dot forming condition, the relatively large dots such as a medium dot or a large dot may be formed along the edge EL of the thin line. In this case, for example, if the error value corresponding to the medium dot and the large dot is distributed to the unprocessed pixels, there is a possibility that a dot is not formed at the periphery. As a result, in a case where the density of the thin line is relatively low, a dot does not tend to be formed at pixels in the vicinity of the edge of the thin line. Hence, for instance, there is a possibility that a dot is not formed at a core portion of the thin line, the core portion being a portion other than edges. In the first embodiment, thin lines particularly having relatively low density can be printed properly while suppressing occurrence of such problem.

As understood from the above description, according to the first embodiment, the determination threshold for small dot TH_S is an example of the first threshold and the small dot density VSdot is an example of the first density.

B. Second Embodiment

The second embodiment is different from the first embodiment in terms of content of the special process. The steps other than the special process of the second embodiment is the same as those of the first embodiment, therefore the description will be omitted.

Figure 8:
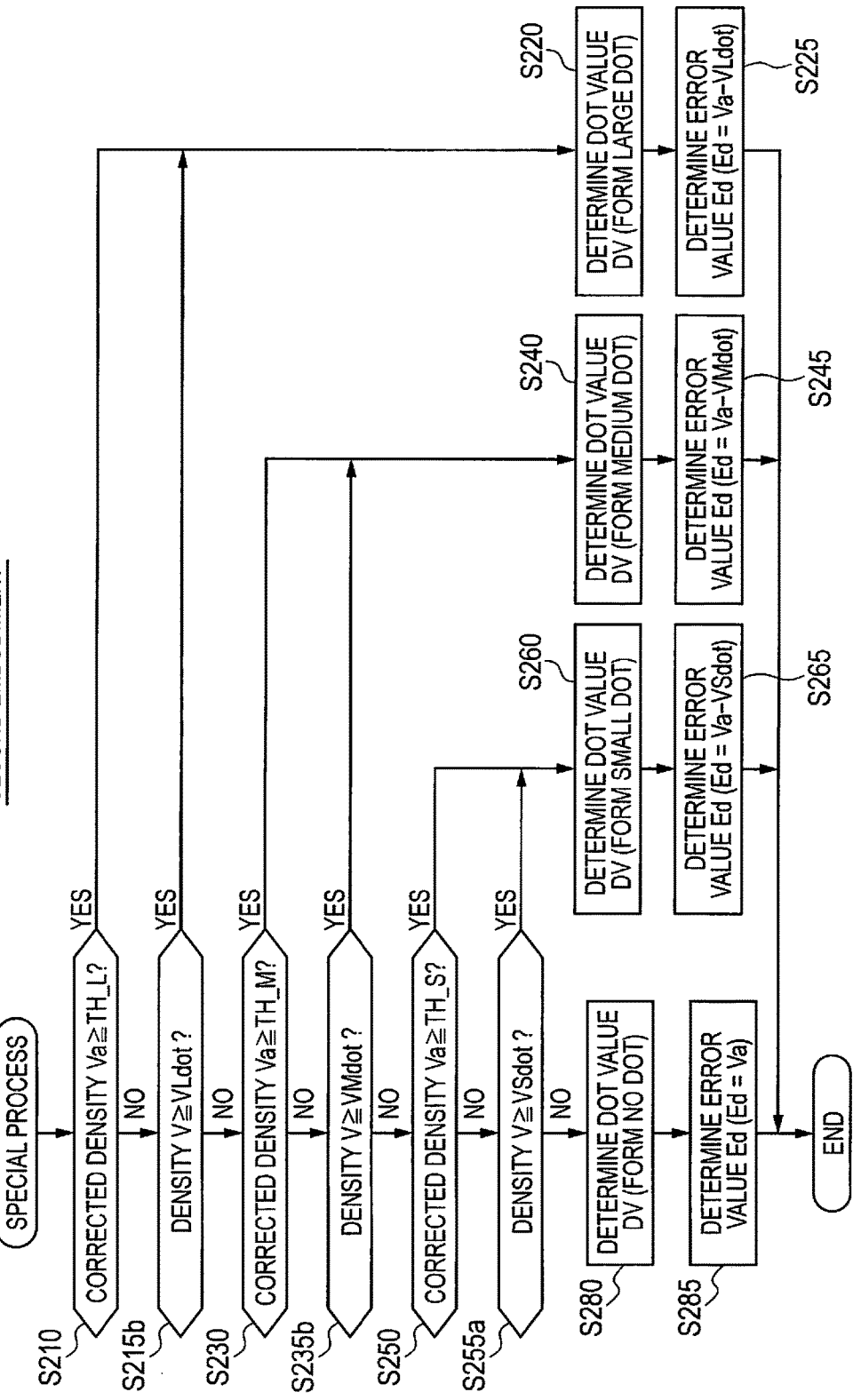
FIG. 8 is a flowchart of a special process of a second embodiment.

The special process of the second embodiment in FIG. 8 is different from the special process of the first embodiment in FIG. 7 in that two steps S215b and S253B are added to the special process of the second embodiment.

In S210, in a case where the corrected density Va is lower than the determination threshold for large dot TH_L (S210: No), in S215b, the CPU 110 determines whether the target pixel density V is higher than or equal to the large dot density VLdot. In a case where the target pixel density V is higher than or equal to the large dot density VLdot (S215b: Yes), in S220, the CPU 110 sets the dot value DV to a value indicative of forming a large dot. In a case where the target pixel density V is lower than the large dot density VLdot (S215b: No), in S230, the CPU 110 determines whether the corrected density Va is higher than or equal to the determination threshold for medium dot TH_M.

In S230, in a case where the corrected density Va is lower than the determination threshold for medium dot TH_M (S230: No), in S235b, the CPU 110 determines whether the target pixel density V is higher than or equal to the medium dot density VMdot. In a case where the target pixel density V is higher than or equal to the medium dot density VMdot (S235b: Yes), in S240, the CPU 110 sets the dot value DV to a value indicative of forming a medium dot. In a case where the target pixel density V is lower than the medium dot density VMdot (S235b: No), the CPU 110 in S250 determines whether the corrected density Va is higher than or equal to the determination threshold for small dot TH_S.

The other steps of the special process of the second embodiment shown in FIG. 8 are the same as those of the first embodiment shown in FIG. 7. Therefore, the same processes in FIG. 8 as those of the special process in FIG. 7 are given the same reference numerals.

According to the above described second embodiment, in a case where the large dot forming condition is not satisfied (S210: No of FIG. 8), where the target pixel is the particular edge pixel (S140: Yes of FIG. 3), and where the target pixel density V is higher than or equal to the large dot density VLdot (S215b: Yes of FIG. 8), the CPU 110 sets the dot value DV to a value indicative of forming a large dot (S220 of FIG. 8). Satisfying that the target pixel is the particular edge pixel and the target pixel density V is higher than or equal to the large dot density VLdot is an example of a particular condition for a large dot.

Similarly, in a case where the medium dot forming condition is not satisfied (S230: No of FIG. 8), where the target pixel is the particular edge pixel (S140: Yes of FIG. 3), and where the target pixel density V is higher than or equal to the medium dot density VMdot (S235b: Yes of FIG. 8), the CPU 110 sets the dot value DV to a value indicative of forming a medium dot (S240 of FIG. 8). Satisfying that the target pixel is the particular edge pixel and the target pixel density V is higher than or equal to the medium dot density VMdot is an example of a particular condition for a medium dot.

In this way, even though the dot forming condition of the particular size dot is not satisfied, the dot value DV of the particular edge pixel having a density higher than or equal to the particular size dot (for example, a medium dot or a large dot) is set to a value indicative of forming the particular size dot. As a result, it is capable of properly suppressing break of thin lines having the density higher than or equal to the particular size dot and also capable of preventing the density of the thin lines in the print image PI from becoming lower than the density of the original image OI. For example, in the second embodiment, the edge of thin lines having the density higher than or equal to the medium dot VMdot in the original image OI is expressed in the print image PI by either medium dots or large dots. Moreover, an edge of a thin line having density higher than or equal to the large dot density VLdot in the original image OI is expressed by large dots in the print image. As a result, in the print image PI, the edge of thin lines can be expressed properly in the print image PI. For example, the edge of thin lines having relatively higher density is expressed by small dots, which prevents a problem that the edge density of a thin line appears to be low. Thus, the edge of thin lines having a relatively higher density can be expressed more clearly.

C. Third Embodiment

The third embodiment is different from the second embodiment in terms of content of the special process. The steps other than the special process of the third embodiment are the same as those of the second embodiment, therefore the description will be omitted.

The special process of the third embodiment in FIG. 9 is different from the special process of the second embodiment in FIG. 8 in that three steps of S258c, S270c, and S275c are added thereto.

In S255a, if the target pixel density is lower than the small dot density VSdot (S255a: No), in S258c, the CPU 110 determines whether the target pixel density V is higher than or equal to a particular density VSS. The particular density VSS is lower than the small dot density VSdot. For example, the particular density VSS is half the small dot density VSdot (VSS=(VSdot/2).

If the target pixel density V is higher than or equal to the particular density VSS (S258c: Yes), in S270c, the CPU 110 sets the dot value DV of the target pixel to a value indicative of forming a small dot. In S275c, the CPU 110 sets the distributed error value Ed to a value that is calculated by subtracting the target pixel density V from the corrected density Va. The distributed error value Ed=(Va−V) in this case is an error value to be distributed from the target pixel when assuming that a virtual dot having the target pixel density V of the original image OI is formed at a position in the print image corresponding to the target pixel of the original image OI. The distributed error value Ed is also referred to as "an error value corresponding to a virtual dot density which is the same as the target pixel density" or "an error value corresponding to the target pixel density". In a case where the process proceeds to S275c, the target pixel density V is higher than or equal to the particular density VSS and lower than the small dot density VSdot. Accordingly, the virtual dot having the density V is a dot of which density is lower than a dot of the smallest size that the printer can form (that is, the small dot in this embodiment).

If the target pixel density V is lower than the particular density VSS (S258c: No), in S280, the CPU 110 sets the dot value DV to a value indicative of forming no dot.

The other steps of the special process of the third embodiment in FIG. 9 are the same as those of the second embodiment in FIG. 8. In FIG. 9, the same processes as in FIG. 8 are indicated by the same reference numerals as those of FIG. 8.

According to the above-described third embodiment, in a case where the small dot forming condition is not satisfied (S250: No of FIG. 9), where the target pixel is the particular edge pixel (S140: Yes of FIG. 3), and where the target pixel density V is higher than or equal to the particular density VSS (Yes in S255a or S258c of FIG. 9), the CPU 110 sets the dot value DV to a value indicative of forming a small dot (S260 or S270c of FIG. 9). Then, in a case where the small dot forming condition is not satisfied (S250: No of FIG. 9), where the target pixel is the particular edge pixel (S140: Yes of FIG. 3), and where the target pixel density V is higher than or equal to the small dot density VSdot (S255a: Yes of FIG. 9), the CPU 110 sets the distributed error value Ed to a first error value (Va−VSdot) corresponding to the density of a dot having the density VSdot (S265 of FIG. 9). In a case where the small dot forming condition is not satisfied (S250: No of FIG. 9), where the target pixel is a particular edge pixel (S140: Yes of FIG. 3), and where the target pixel density V is higher than or equal to the particular density VSS and lower than the small dot density (S258c: Yes of FIG. 9), the CPU 110 sets the distributed error value Ed to a second error value (Va−V) corresponding to the dot density having a lower density than the small dot density VSdot (S275c of FIG. 9).

Accordingly, a small dot is formed in a case where the target pixel does not satisfy the dot forming condition, where the target pixel is a particular edge pixel, where the target pixel density is lower than the small dot density VSdot, and where the target density is higher than or equal to the particular density VSS. As a result, in the print image PI, since the small dot can be formed along an edge of a thin line having a relatively low density that is higher than or equal to the particular density VSS and lower than the dot density VSdot, thereby suppressing break of thin lines having a relatively low density.

Moreover, in this case, irrespective of the forming a small dot, the distributed error value Ed of the target pixel is set to the second error value (Va−V) corresponding to a dot density which is lower than the small dot density VSdot. As a result, in the print image PI, a dot is formed in the vicinity of the edge of the thin line having a relatively low density which is higher than or equal to the particular density VSS and lower than the small dot density VSdot. Accordingly, break of thin lines having relatively low density can be suppressed appropriately. For example, when forming small dots along the edge of the thin lines having a relatively low density that is lower than the small dot density VSdot, if the distributed error value Ed corresponding to the small dot density is distributed, the distributed error value Ed becomes excessively small, which causes the density of dots in the vicinity of the edge in the print image PI to be deteriorated. The present embodiment suppresses such a problem.

It can be said that the second error value (Va−V) is an error value corresponding to the virtual dot density that is the target pixel density V. Hence, the appropriate distributed error value Ed is set depending on the target pixel density V. Accordingly, due to the distribution of inappropriate distribution error value Ed, it is capable of preventing deterioration of the print image PI.

Further, the particular density VSS is lower than the density VSdot of the smallest-size dot (small dot) among the plurality of sizes that can be formed by the printer 200. As a result, break of the thin lines having a lower density than the density of the small size dot can be suppressed appropriately in the print image PI.

D. Modifications

While the disclosure has been described in detail with reference to the above aspects thereof, it would be apparent to those skilled in the art that various changes and modifications may be made therein without departing from the scope of the claims.

(1) In the special process of FIG. 7 of the above-described first embodiment, in a case where the large dot forming condition or the medium dot forming condition is not satisfied (S230: No), the dot value may be set to a value indicative of forming a small dot. In other words, if the target pixel is the particular edge pixel, a dot may be always formed. In this case, too, break the edge of thin lines can be suppressed in the print image PI.

(2) The printer 200 in each of the above-described embodiment is configured to form three sizes of dot: large, medium, and small. Alternatively, the printer 200 may be configured to form dots of four sizes: extra-large, large, medium, and small. Alternatively, the printer may be configured to form large and small dots. In the former case, in the normal process, it is determined whether the target pixel satisfies the dot forming condition of four sizes of dots by comparing, with the corrected density Va, four kinds of thresholds for four sizes of dots of extra-large, large, medium, and small. If one of the dot forming conditions is satisfied, the dot value of the target pixel is set to a value indicative of forming a dot having a size for which the dot forming condition is satisfied. In the special process of the first embodiment, if none of the dot forming conditions of four types of dot is satisfied and the special condition including that the target pixel is a particular edge pixel is satisfied, the dot value of the target pixel is set to a value indicative of forming a small dot.

Alternatively, the printer 200 is configured to form only one size dot. In this case, for example, in the normal process, it is determined whether the target pixel satisfies the dot forming condition by comparing the threshold for one size dot with the corrected density Va. Then, if the dot forming condition is satisfied, the dot value of the target pixel is set to a value indicative of forming a dot. In the special process of the first embodiment, if the dot forming condition is not satisfied and the special condition including that the target pixel is the particular edge pixel is satisfied, the dot value of the target pixel is set to a value indicative of forming a dot.

(3) In the above-described first embodiment, the dot value DV is set to a value indicative of forming a small dot in a case where the dot forming condition of the error diffusion method is not satisfied, where the target pixel is the particular edge pixel, and where the target pixel density V is higher than or equal to the small dot density VSdot. This small dot density VSdot as the threshold may be changed to a predetermined density different from the small dot density VSdot. The predetermined density may be, for example, higher than the small dot density VSdot and lower than the medium dot density VMdot.

(4) According to S275c of the third embodiment shown in FIG. 9, the distributed error value Ed is set to the error value (Va−V) corresponding to a virtual dot density that is the target pixel density V. Alternatively, irrespective of the target pixel density V, the distributed error value Ed may be set to the error value (Va−Vb) corresponding to the density of a virtual dot having a predetermined density Vb. The predetermined density Vb may be, for example, the particular density VSS.

(5) The printing mechanism 290 of the printer according to each of the above embodiment forms images with four kinds of ink C, M, Y, and K. However, for example, the printer 200 may be a monochromatic printer which forms images with K (black) ink only. Alternatively, the printing mechanism 290 may have three kinds of ink C, M, and Y, or the printing mechanism 290 may have one or more kinds of other ink (for example, light cyan (LC), light magenta (LM)), and so on, in addition to the C, M, Y, and K. The printing mechanism 290 may be other types of printing mechanisms. For example, the printing mechanism 290 may be a laser printing mechanism which prints images with a plurality of kinds of toner as the coloring material.

(6) In each of the above embodiment, the printing process performed by the terminal apparatus 100 may, for example, be executed by the CPU 210 of the printer 200. In this case, the terminal apparatus 100 is not necessary. The terminal apparatus 100 may only transmit, to the printer 200, a print job based on a print instruction. In such a case, the printing mechanism 290 provided in the housing of the printer 200 is an example of the printer, and the CPU 210 provided in the housing of the printer 200 is an example of the image processor for the printer.

In addition, instead of the terminal apparatus 100, the server which is connected to the printer through a network such as Internet may perform a printing process of each embodiment. In this case, the printing process of each embodiment will be performed when a print job is transmitted from the terminal apparatus 100 or the printer 200 to the server. In S70 of FIG. 2, the server then transmits a print data to the printer 200, and the server causes the printer 200 to perform printing. In such a case, the server is an example of the image processor for the printer. The server may be a single computer or the so-called cloud server including a plurality of computers which communicate with each other.

(7) In each of the above-described embodiments, a part of configurations realized by hardware may be replaced with software, and conversely, a part or entirety of configurations realized by software may be replaced with hardware.

When a part or entirety of the functions of this disclosure is realized by a computer program, the program may be provided in a form stored in a computer-readable storage medium (for example, a non-transitory storage medium). The program may be used in a state where the program is stored in the same or different storage medium (computer-readable storage medium) from the storage medium by which the program is provided. The "computer-readable storage medium" may include a portable storage medium such as a memory card and a CD-ROM, an internal memory such as various ROM, and an external storage device, such as a hard disk drive, connected to the computer.

What is claimed is:
1. An image processor for a printer, comprising:
a processor; and
a memory storing instructions, the instructions, when executed by the processor, causing the processor to perform:
    acquiring original image data representing an original image including a plurality of pixels, the original image data being indicative of a density of each of the plurality of pixels;
    determining whether a dot forming condition of an error diffusion method is satisfied by using a density of a target pixel in the plurality of pixels and an error value distributed to the target pixel;
    determining whether the target pixel is an edge pixel constituting an edge together with a surrounding pixel, the edge pixel having a higher density than a density of the surrounding pixel;
    determining a dot value indicative of a dot formation state of the target pixel, the determining the dot value including:
        setting the dot value to a value indicative of forming a dot in a case where the dot forming condition is satisfied;
        setting the dot value to a value indicative of forming no dot in a case where the dot forming condition is not satisfied and the target pixel is not the edge pixel; and
        setting the dot value to a value indicative of forming a dot in a case where the dot forming condition is not satisfied and a particular condition is satisfied, the particular condition including that the target pixel is the edge pixel;
    setting a distribution error value to a smaller value than another error value in a case where the dot forming condition is not satisfied and the particular condition is satisfied and thereby the dot value of the target pixel is set to the value indicative of forming a dot, the distribution error value being an error value to be distributed from the target pixel to an unprocessed pixel, and the another error value being an error value to be distributed from the target pixel to the unprocessed pixel in a case where the dot value of the target pixel is set to the value indicative of forming no dot; and generating print data including the dot value of each of the plurality of pixels determined by processing each of the plurality of pixels as the target pixel.

2. The image processor according to claim 1, wherein the instructions, when executed by the processor, cause the processor to perform:
in a case where the dot forming condition is not satisfied and the target pixel is the edge pixel and the density of the target pixel is higher than or equal to a first density, setting the dot value to the value indicative of forming a dot; and
in a case where the dot forming condition is not satisfied and the target pixel is the edge pixel and the density of the target pixel is lower than the first density, setting the dot value to the value indicative of forming no dot.

3. The image processor according to claim 2, wherein the instructions, when executed by the processor, cause the processor to perform:
in a case where the dot forming condition is not satisfied, the target pixel is the edge pixel, and the density of the target pixel is higher than or equal to the first density, setting the dot value to a value indicative of forming a dot having a second density higher than the first density;
in a case where the dot forming condition is not satisfied, the target pixel is the edge pixel, and the density of the target pixel is higher than or equal to the second density, setting the distribution error value to a first error value corresponding to a density of a dot having the second density; and
in a case where the dot forming condition is not satisfied, the target pixel is the edge pixel, and the density of the target pixel is higher than or equal to the first density and lower than the second density, setting the distribution error value to a second error value corresponding to a density of a dot having a lower density than the second density.

4. The image processor according to claim 3, wherein the second error value is an error value corresponding to a density of an imaginary dot having the density of the target pixel.

5. The image processor according to claim 3, wherein the printer is configured to form dots of a plurality of sizes; and
wherein the second density is a density of a dot of a smallest size in the plurality of sizes.

6. The image processor according to claim 2, wherein the instructions, when executed by the processor, cause the processor to perform:
determining that the dot forming condition is satisfied in a case where a corrected density is higher than or equal to a first threshold value, the corrected density being obtained by correcting the density of the target pixel by using an error value distributed to the target pixel; and
wherein the first density is higher than or equal to a density indicated by the first threshold value.

7. The image processor according to claim 1, wherein the instructions, when executed by the processor, cause the processor to perform:
in the case where the dot forming condition is satisfied, setting the dot value to a value indicative of forming a dot of a particular size;
in the case where the dot forming condition is not satisfied and the particular condition is satisfied, setting the dot value to the value indicative of forming a dot of the particular size; and
in response to setting the dot value of the target pixel to the value indicative of forming a dot of the particular size, setting the distribution error value to an error value corresponding to a density of a dot of the particular size, regardless of whether the dot forming condition is satisfied.

8. The image processor according to claim 7, wherein the instructions, when executed by the processor, cause the processor to perform:
in a case where the dot forming condition is not satisfied, the target pixel is the edge pixel, and the density of the target pixel is higher than or equal to the density of the dot of the particular size, setting the dot value to the value indicative of forming the dot of the particular size.

9. The image processor according to claim 1, wherein the printer is configured to form a first dot and a second dot smaller than the first dot; and
wherein the instructions, when executed by the processor, cause the processor to perform:
in a case where the dot forming condition of the first dot is satisfied, setting the dot value to a value indicative of forming the first dot;
in a case where the dot forming condition of the second dot is satisfied, setting the dot value to a value indicative of forming the second dot;
in a case where the dot forming condition of the first dot is not satisfied, the dot forming condition of the second dot is not satisfied, and the target pixel is not the edge pixel, setting the dot value to a value indicative of forming no dot; and
in a case where the dot forming condition of the second dot is not satisfied and the particular condition of the second dot is satisfied, setting the dot value to a value indicative of forming the second dot.

10. The image processor according to claim 9, wherein the instructions, when executed by the processor, cause the processor to perform:
in a case where the dot forming condition of the first dot is not satisfied, not setting the dot value to a value indicative of forming the first dot, regardless of whether the particular condition is satisfied.

11. The image processor according to claim 10, wherein the instructions, when executed by the processor, cause the processor to perform:
in the case where the dot forming condition of the first dot is not satisfied, setting the dot value to either a value indicative of forming a dot smaller than the first dot or a value indicative of forming no dot, regardless of whether the particular condition is satisfied.

12. The image processor according to claim 9, wherein the instructions, when executed by the processor, cause the processor to perform:
in a case where the dot forming condition of the first dot is not satisfied and the particular condition of the first dot is satisfied, setting the dot value to a value indicative of forming the first dot; and
in the case where the dot forming condition of the second dot is not satisfied and the particular condition of the second dot is satisfied, setting the dot value to a value indicative of forming the second dot.

13. The image processor according to claim 12, wherein the particular condition of the first dot is that the target pixel is the edge pixel and that the density of the target pixel is higher than or equal to a density of the first dot; and
wherein the particular condition of the second dot is that the target pixel is the edge pixel and that the density of the target pixel is higher than or equal to a density of the second dot.

14. A non-transitory computer-readable storage medium storing a set of program instructions executable on an image processor for a printer, the set of program instructions comprising:
    acquiring original image data representing an original image including a plurality of pixels, the original image data being indicative of a density of each of the plurality of pixels;
    determining whether a dot forming condition of an error diffusion method is satisfied by using a density of a target pixel in the plurality of pixels and an error value distributed to the target pixel;
    determining whether the target pixel is an edge pixel constituting an edge together with a surrounding pixel, the edge pixel having a higher density than a density of the surrounding pixel;
    determining a dot value indicative of a dot formation state of the target pixel, the determining the dot value including:
        setting the dot value to a value indicative of forming a dot in a case where the dot forming condition is satisfied;
        setting the dot value to a value indicative of forming no dot in a case where the dot forming condition is not satisfied and the target pixel is not the edge pixel; and
        setting the dot value to a value indicative of forming a dot in a case where the dot forming condition is not satisfied and a particular condition is satisfied, the particular condition including that the target pixel is the edge pixel;
    setting a distribution error value to a smaller value than another error value in a case where the dot forming condition is not satisfied and the particular condition is satisfied and thereby the dot value of the target pixel is set to the value indicative of forming a dot, the distribution error value being an error value to be distributed from the target pixel to an unprocessed pixel, and the another error value being an error value to be distributed from the target pixel to the unprocessed pixel in a case where the dot value of the target pixel is set to the value indicative of forming no dot; and
    generating print data including the dot value of each of the plurality of pixels determined by processing each of the plurality of pixels as the target pixel.

15. The non-transitory computer-readable storage medium according to claim 14, wherein the set of program instructions comprises:
    in a case where the dot forming condition is not satisfied and the target pixel is the edge pixel and the density of the target pixel is higher than or equal to a first density, setting the dot value to the value indicative of forming a dot; and
    in a case where the dot forming condition is not satisfied and the target pixel is the edge pixel and the density of the target pixel is lower than the first density, setting the dot value to the value indicative of forming no dot.

16. The non-transitory computer-readable storage medium according to claim 15, wherein the set of program instructions comprises:
    in a case where the dot forming condition is not satisfied, the target pixel is the edge pixel, and the density of the target pixel is higher than or equal to the first density, setting the dot value to a value indicative of forming a dot having a second density higher than the first density;
    in a case where the dot forming condition is not satisfied, the target pixel is the edge pixel, and the density of the target pixel is higher than or equal to the second density, setting the distribution error value to a first error value corresponding to a density of a dot having the second density; and
    in a case where the dot forming condition is not satisfied, the target pixel is the edge pixel, and the density of the target pixel is higher than or equal to the first density and lower than the second density, setting the distribution error value to a second error value corresponding to a density of a dot having a lower density than the second density.

17. The non-transitory computer-readable storage medium according to claim 15, wherein the set of program instructions comprises:
    determining that the dot forming condition is satisfied in a case where a corrected density is higher than or equal to a first threshold value, the corrected density being obtained by correcting the density of the target pixel by using an error value distributed to the target pixel; and
    wherein the first density is higher than or equal to a density indicated by the first threshold value.

18. The non-transitory computer-readable storage medium according to claim 14, wherein the set of program instructions comprises:
    in the case where the dot forming condition is satisfied, setting the dot value to a value indicative of forming a dot of a particular size;
    in the case where the dot forming condition is not satisfied and the particular condition is satisfied, setting the dot value to the value indicative of forming a dot of the particular size; and
    in response to setting the dot value of the target pixel to the value indicative of forming a dot of the particular size, setting the distribution error value to an error value corresponding to a density of a dot of the particular size, regardless of whether the dot forming condition is satisfied.

19. The non-transitory computer-readable storage medium according to claim 14, wherein the printer is configured to form a first dot and a second dot smaller than the first dot; and
    wherein the set of program instructions comprises:
        in a case where the dot forming condition of the first dot is satisfied, setting the dot value to a value indicative of forming the first dot;
        in a case where the dot forming condition of the second dot is satisfied, setting the dot value to a value indicative of forming the second dot;
        in a case where the dot forming condition of the first dot is not satisfied, the dot forming condition of the second dot is not satisfied, and the target pixel is not the edge pixel, setting the dot value to a value indicative of forming no dot; and
        in a case where the dot forming condition of the second dot is not satisfied and the particular condition of the second dot is satisfied, setting the dot value to a value indicative of forming the second dot.

20. The non-transitory computer-readable storage medium according to claim 19, wherein the set of program instructions comprises:
    in a case where the dot forming condition of the first dot is not satisfied, not setting the dot value to a value indicative of forming the first dot, regardless of whether the particular condition is satisfied.

* * * * *